May 20, 1958 A. C. NIXON ET AL 2,835,714
SEPARATION OF ORGANIC COMPOUNDS
Filed March 31, 1950 8 Sheets-Sheet 1
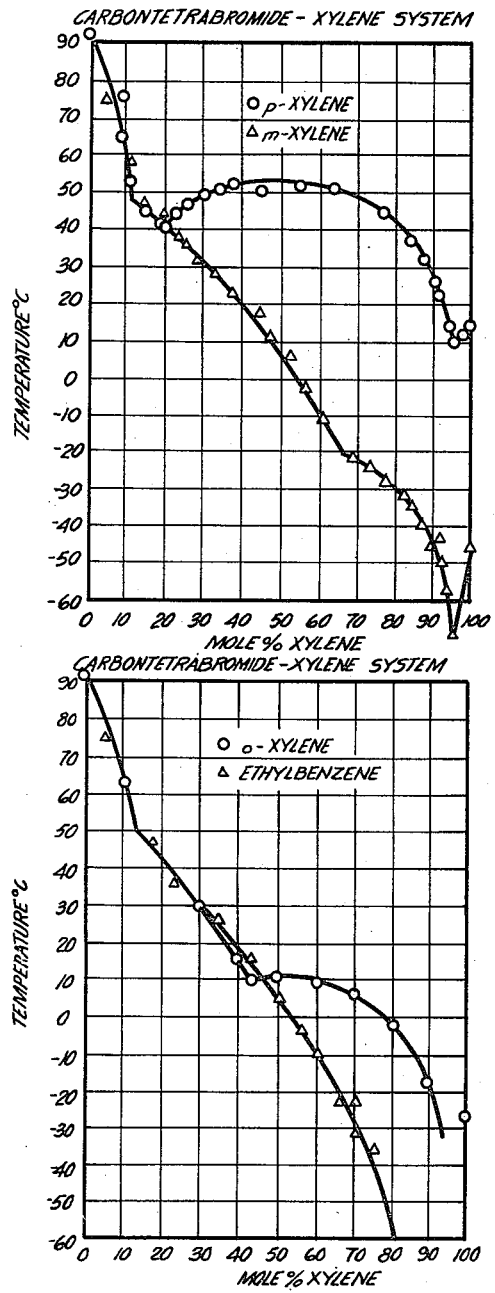
Fig. I
Inventors:
Alan C. Nixon
Carl H. Deal Jr.
Raymond A. Wilson
By Their Attorney: James Todorovic

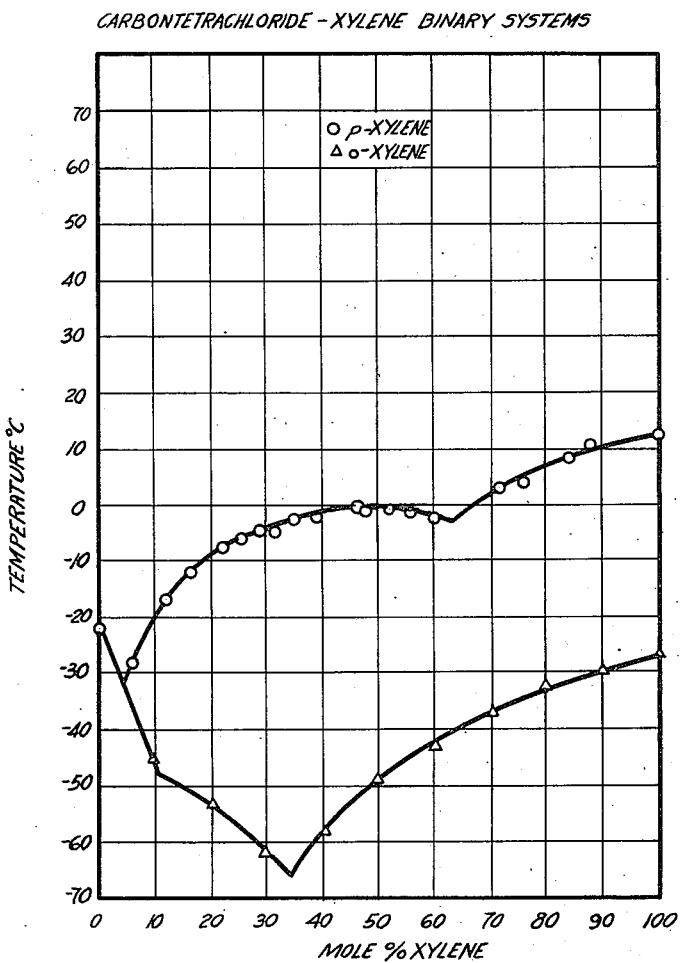
Fig. II

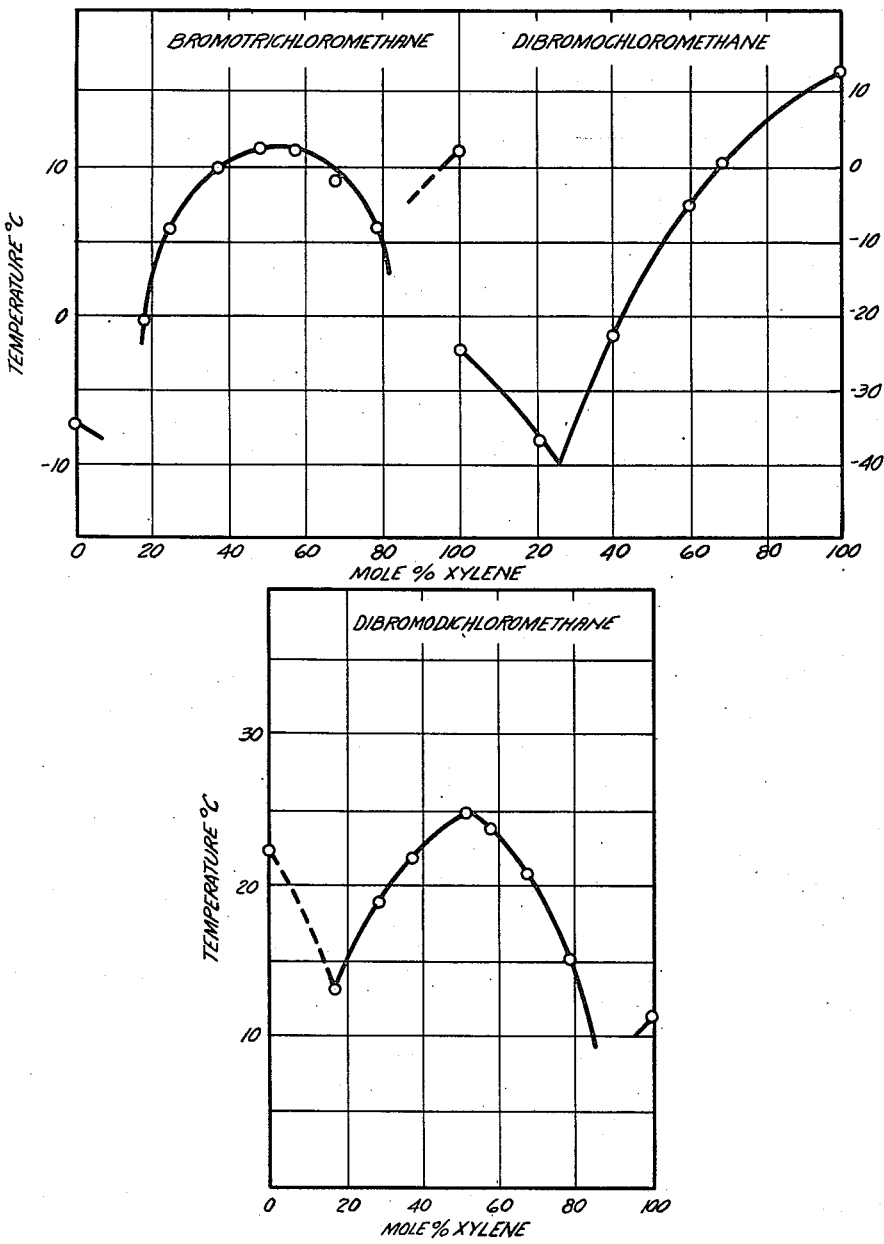
Fig. III
Inventors:
Alan C. Nixon
Carl H. Deal Jr.
Raymond A. Wilson

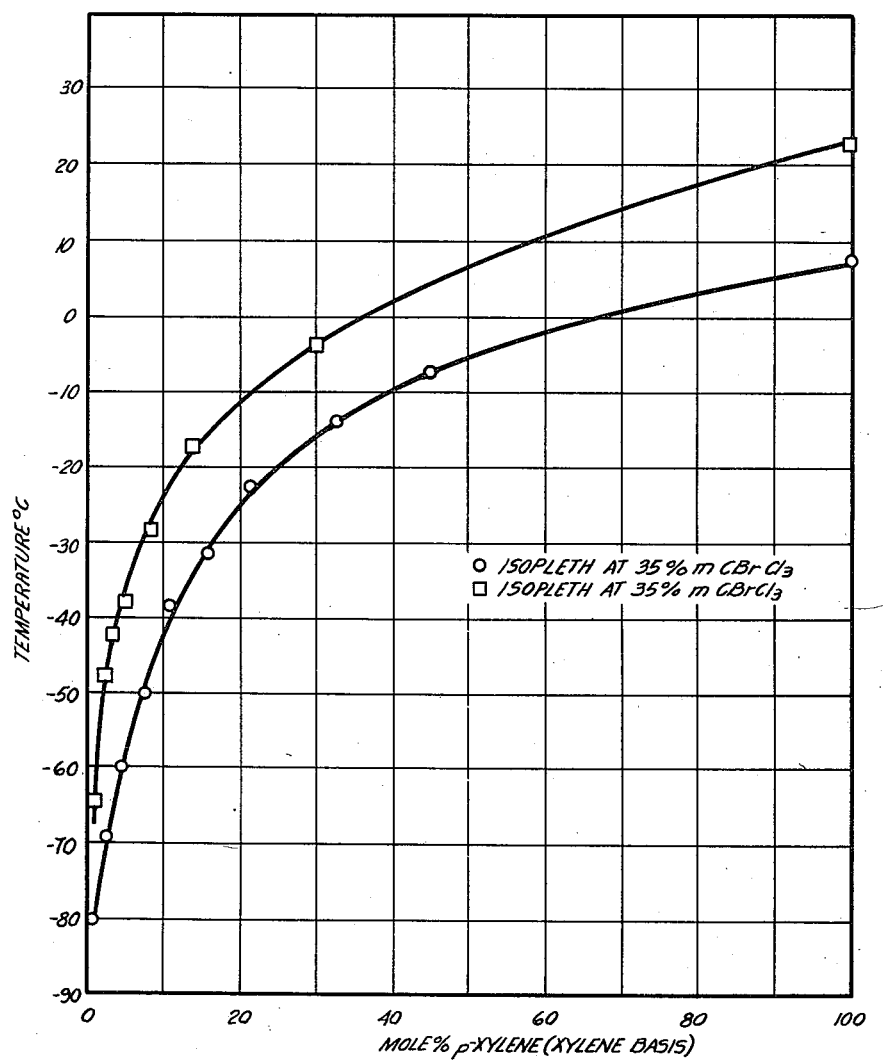
Fig. IV — Bromotrichloromethane and Dibromodichloromethane with a Commercial Xylene Mixture

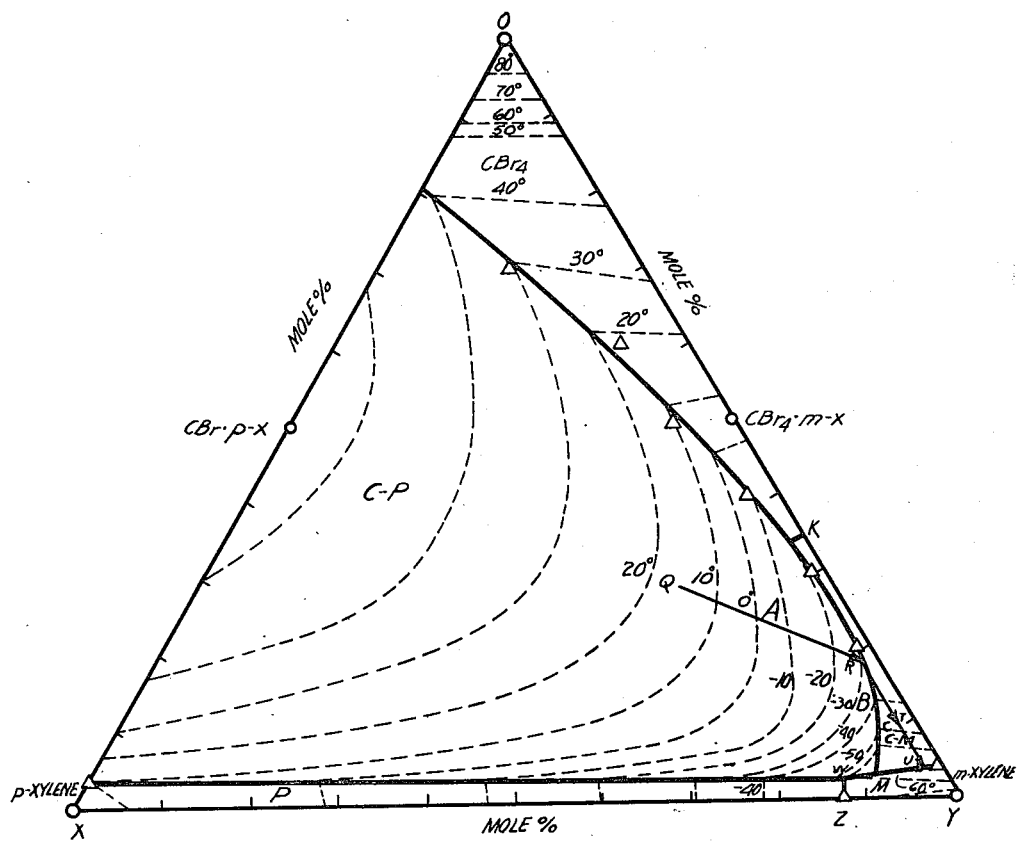
Fig. V
CARBONTETRABROMIDE: m-XYLENE: p-XYLENE SYSTEM
- - - - ISOTHERMALS
———— EUTECTIC OR INCONGRUENCY LINES
△ EUTECTIC POINTS
○ COMPOUNDS
Inventors:
Alan C. Nixon
Carl H. Deal Jr.
Raymond A. Wilson
By Their Attorney  James Jodbrovic

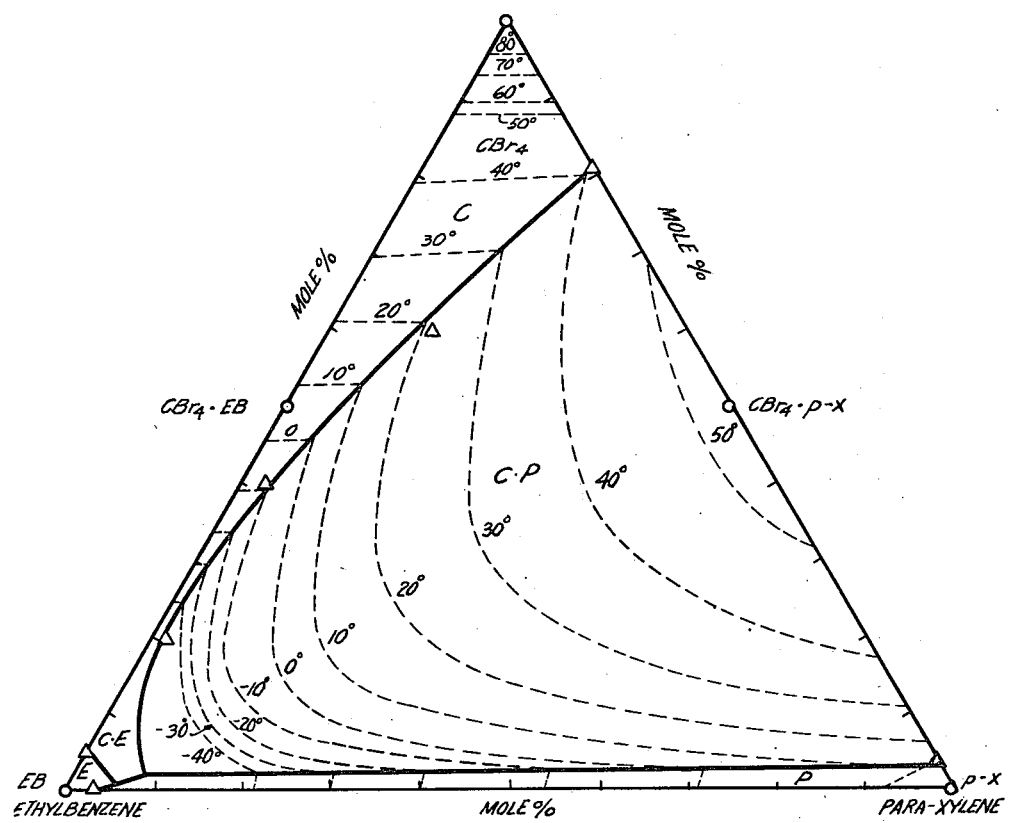
FIG. VI
CARBONTETRABROMIDE : p-XYLENE - ETHYLBENZENE SYSTEM
- - - - ISOTHERMALS
——— EUTECTIC OR INCONGRUENCY LINES
△ EUTECTIC POINTS
○ COMPOUNDS
Inventors: Alan C. Nixon
Carl H. Deal Jr.
Raymond A. Wilson
By Their Attorney: James Todorovic

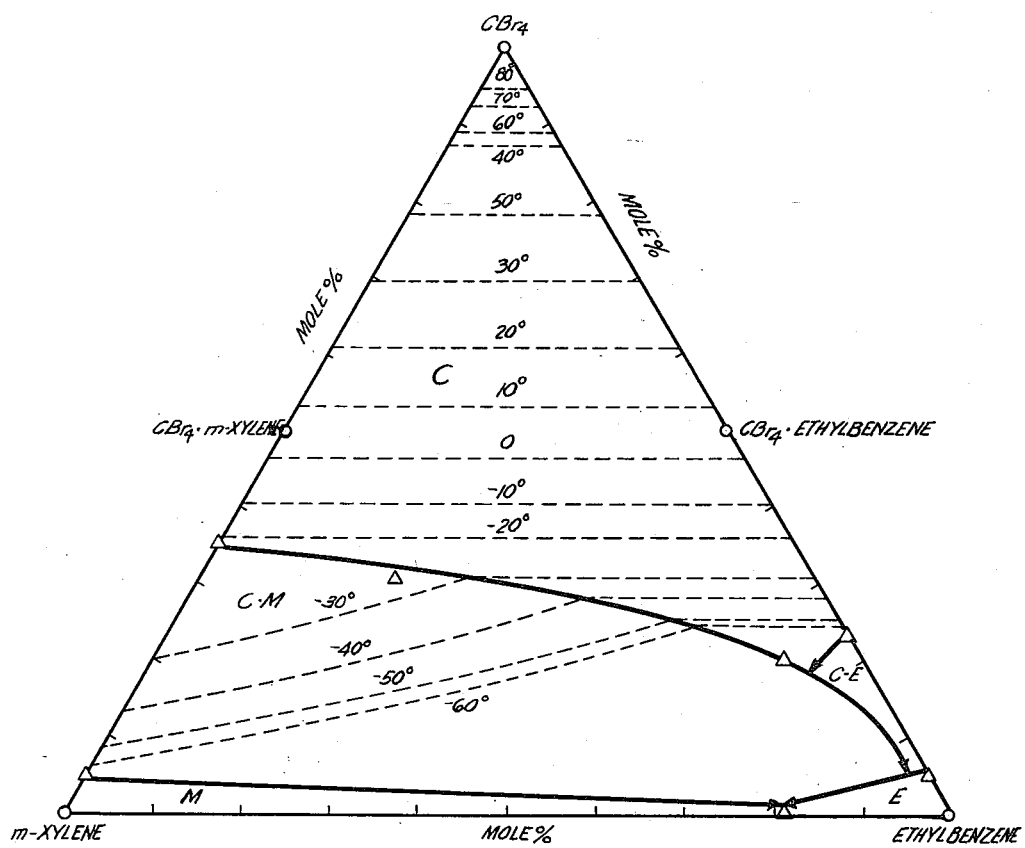

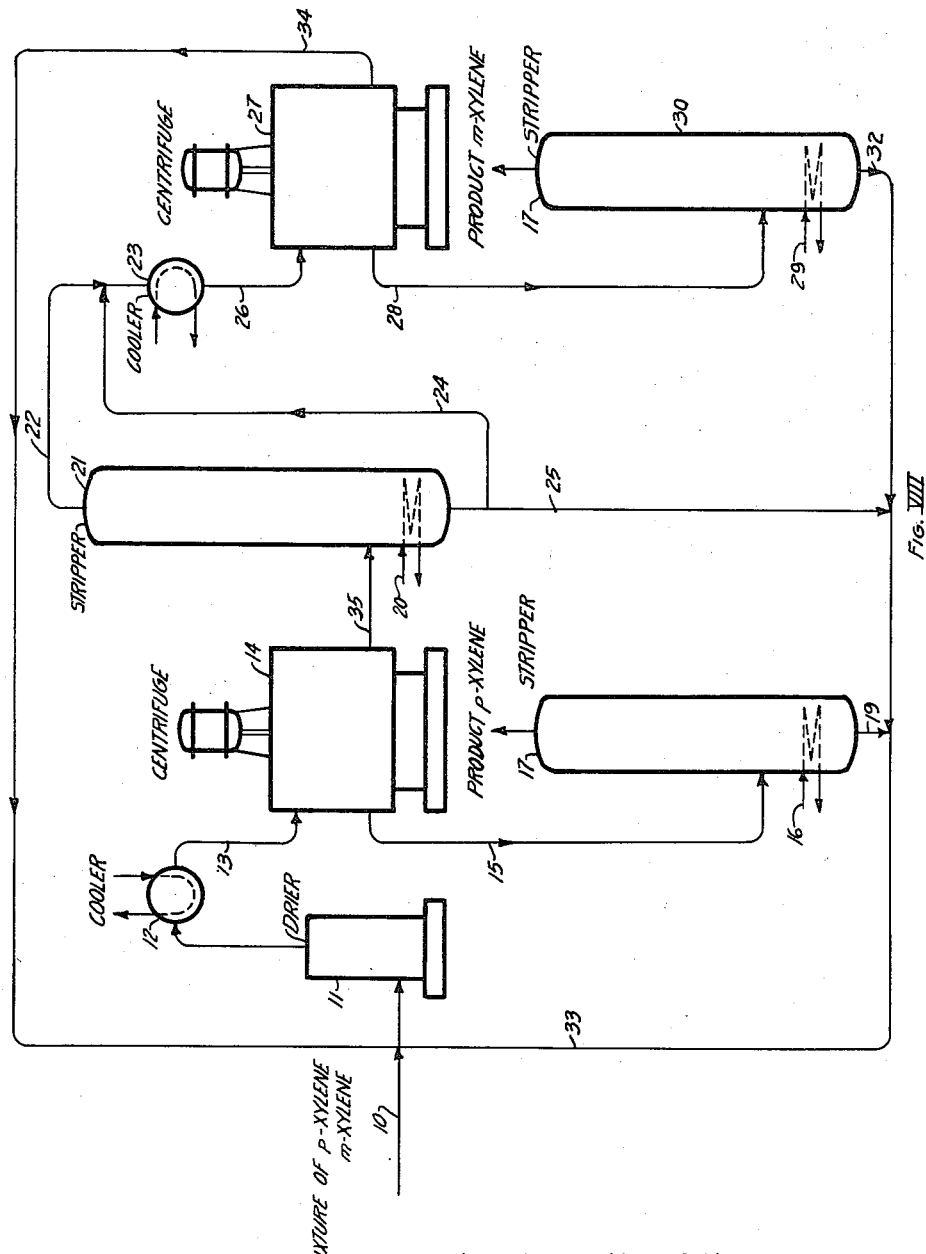

2,835,714
Patented May 20, 1958

2,835,714

SEPARATION OF ORGANIC COMPOUNDS

Alan C. Nixon, Berkeley, Carl H. Deal, Jr., Orinda, and Raymond A. Wilson, Berkeley, Calif., assignors to Shell Development Company, San Francisco, Calif., a corporation of Delaware Application March 31, 1950, Serial No. 153,253

2 Claims. (Cl. 260—674)

This invention relates to novel organic complexes formed by aromatic hydrocarbons and halocarbons and to a method for the separation of mixtures of organic compounds. More particularly, this invention pertains to the separation of mixtures of aromatic hydrocarbons by a process involving the crystallization of these novel organic complexes. Specifically, the invention is concerned with the separation and purification of substituted aromatic hydrocarbons from isomers thereof by a method involving crystallization of one of the substituted hydrocarbons as a complex with a halocarbon. In one aspect the invention is concerned with the separation and purification of a disubstituted benzene compound, for example para-xylene, from mixtures thereof with other isomeric aromatic compounds.

Mixtures of certain aromatic compounds, such as benzene, alkyl benzenes (toluene, xylenes, etc.) hydroxylbenzenes (phenol, etc.) and hydroxy-alkyl-benzenes (cresols, xylenols, etc.) are produced as by-products from the coking of coal and also from certain petroleum conversion and separation processes. Mixtures of still other aromatic compounds, such as the nuclear-halogenated derivatives of benzene, toluene and the like are produced by suitable halogenation reactions of the corresponding aromatic compound as well as alkylation, for example, of halogenated benzene derivatives. Mixtures of isomeric nitro-aromatic compounds are obtained by nitration of aromatics, such as mixtures of isomeric nitrotoluenes by the nitration of toluene; reduction of the nitrogroups yield mixtures of aromatic amines, such as toluidines. Other mixtures are mixtures of the various picolines, lutidines and isomeric substituted pyridines.

Various methods have been proposed for effecting at least partial separations as applied to mixtures as indicated above. Where there is a sufficient difference in the boiling points of some of the constituents of the given mixtures, the separation is effected by fractional distillation. Thus, ortho-xylene (B. P. 144.4° C. at atmospheric pressure) can be separated from a mixture containing it and the meta- and para-xylenes (boiling points, 139.3° C. and 138.5° C., respectively) by fractional distillation. However, the meta- and para-xylenes cannot be separated from each other by such a method. A similar situation exists for other mixtures, such as a mixture of the ortho-, meta-, and para-cresols. In still other cases a separation of the ortho- from the meta- and para-isomers may be effected by distillation, even though the relative boiling points may be reversed, that is, the boiling point of the ortho-isomer is lower than the boiling points of the meta- and para-isomers, such as is true in the case of the ortho-, meta- and para-chloro-hydroxy-benzenes, the bromo-hydroxy-benzenes, the toluic acids and the dihydroxy-benzenes. But in some cases the boiling points of all three isomers are too close together to permit effective separation by fractional distillation on a commercial scale, such as in the case of the isomeric methylchlorobenzenes, the isomeric methylbromobenzenes and the dibromobenzenes.

Separations by fractional crystallization have been utilized in some cases; but, in general eutectic mixtures are formed after only partial separation of one of the constituents, thus making it possible to obtain only one of the constituents in any substantial degree of purity while not obtaining any of them in a separated substantially pure form in sufficiently high yields.

In still other cases, particularly in the case of highly polar substituted derivatives, such as the phenolic substances, separations have been effected by first subjecting the mixture to chemical conversion, such as sulfonation, alkylation, etc., followed by separation of the resulting mixture of new derivatives, and then reconversion of the separated substances such as by desulfonation, dealkylation, etc. to the original substances.

In general however, the methods heretobefore available have not been entirely satisfactory for the separation and recovery of isomeric aromatic compounds and other aromatic substances normally admixed therewith and having similar boiling points.

It is, therefore, a principal object of the present invention to provide an efficient and economical process for the separation of mixture of organic compounds, particularly closely related organic compounds, such as isomers. A further object is to provide a method for the separation and recovery of one aromatic compound from a mixture thereof with a closely related aromatic compound. A still further object is the separation of a substituted aromatic hydrocarbon from a mixture thereof with a different similarly substituted aromatic hydrocarbon and which may form a eutectic with the first substance when the mixture is cooled sufficiently. Another object is concerned with the separation and recovery of para- and meta-xylenes from a mixture comprised substantially of para- and meta-xylenes. Still another object is to provide a method involving crystallization whereby both substantially pure para-xylene and substantially pure meta-xylene may be obtained from a mixture of the two alone or from commercial mixtures containing them and whereby good yields of both may be secured.

The above-mentioned objects of the invention and the method of attaining them, as well as other objects will be more fully understood and will become apparent from the description of the invention as given hereinafter.

Now, in accordance with the present invention, it has been discovered that a separation and purification of organic compounds may be effected by a process which comprises forming an admixture of a mixture of said compounds and a selected halocarbon and adjusting the temperature of the admixture to solidify substantially only one of said organic compounds therefrom as a solid phase complex with said halocarbon.

Described broadly the invention is a process of separating as substantially pure substances, components from a mixture thereof, by admixing said mixture with a selected halocarbon and adjusting the temperature of the admixture to solidify substantially only one of the components in the form of a solid phase complex with the halocarbon. It is also contemplated as a part of the invention to remove the halocarbon from the resulting solution after the separation of the aforementioned complex and to cool the thereby resulting solution, crystallizing therefrom substantially only one other component in the form of a solid phase complex with the selected halocarbon.

Described more specifically, the invention provides a process of separating as substantially pure substances, components from a mixture thereof, which process comprises adding a selected halocarbon to a mixture containing at least two difficultly separable organic compounds at least one of which is capable of forming a solid phase complex with a selected halocarbon and adjusting the temperature of the resulting mixture to solidify only one of the components in the form of a solid phase complex with said halocarbon thereby causing a corresponding change in the composition of the remaining liquid mixture as a result of the separation of the solid phase complex, further cooling said mixture so as to cause the composition of the mixture to change to a point just short of any eutectic composition formable therefrom or a point at which more than one of the organic components separates as solid phase, thereafter separating said solid phase complex, and recovering said component from the separated solid complex. When another component is also capable of forming a complex with the hydrocarbon, it is also contemplated to remove a quantity of the halocarbon from the resulting mother liquor so as to change its composition such that when the mother liquor is cooled again another component separates out as a solid phase complex with the halocarbon free from the first separated component, then to cool said solution to separate the last-indicated solid phase complex.

The present invention is based on discovery that tetrahalomethanes (i. e. compounds wherein all the hydrogen atoms of methane are replaced by halogen atoms, the same or combinations of different ones), form solid phase complexes with various aromatic hydrocarbons, particularly the $C_8$ and $C_9$ aromatic hydrocarbons containing at least two alkyl groups and that the formation of these solid complexes may be utilized to separate components of mixtures containing isomeric aromatic hydrocarbons. For example, carbon tetrabromide forms equimolecular solid phase complexes with ortho-xylene para-xylene and meta-xylene. Likewise, carbon tetrachloride forms equimolecular solid phase complexes with para-xylene and hemimellitene; also other halomethanes for example, bromotrichloromethane, dibromo dichloromethane form solid phase complexes with aromatic hydrocarbons, for example, para-xylene. Other suitable halomethanes for forming solid phase complexes with aromatic hydrocarbons are carbon tetrafluoride, carbon tetraiodide, chlorotribromomethane, iodotrichloromethane, diiododichloromethane and all the various other tetrahalomethanes. It is contemplated that the employment of the invention is particularly applicable to the separation of mixtures of the various alkyl pyridines, such as mixtures of the various lutidines and picolines as well as to mixtures of the various derivatives of pyrrole, thiophene, quinoline and furan, especially the alkyl derivatives.

Having described the invention in its broad scope it will now be described in greater detail, both as applied broadly and as applied to a more specific embodiment thereof, the description being made with reference to the accompanying drawings which are made part of the specification and wherein:

Fig. I is a diagram containing four separate curves showing the liquid-solid phase relationships of the four separate binary systems: (1) carbon tetrabromide:para-xylene; (2) carbon tetrabromide:meta-xylene; (3) carbon tetrabromide:ortho-xylene; and (4) carbon tetrabromide: ethylbenzene;

Fig. II is a diagram similar to Fig. I, but containing two curves for the two binary systems: (1) carbon tetrachloride:para-xylene and (2) carbon tetrachloride:ortho-xylene.

Fig. III is a diagram similar to Figs. I and II, but containing three curves for the three binary systems: (1) bromotrichloromethane:para-xylene; (2) dibromodichloromethane:para-xylene; and (3) dibromochloromethane:para-xylene.

Fig. IV is a diagram showing the temperature-composition, liquid-solid phase, relationships of commercial mixed xylene mixtures in the presence of: (1) 35 mol percent bromotrichloromethane, and (2) 35 mol percent dibromodichloromethane.

Fig. V is a diagram showing on a mol percentage basis the liquid-solid phase relationships of the ternary system: carbon tetrabromide:meta-xylene:para-xylene and containing lines representing a combination of steps in application of the invention to this specific embodiment.

Fig. VI is a diagram showing on a mol percentage basis the liquid-solid phase relationships of the ternary system: carbon tetrabromide:para-xylene:ethylbenzene;

Fig. VII is a diagram showing on a mol percentage basis the liquid-solid phase relationships of the ternary system: carbon tetrabromide:meta-xylene:ethylbenzene; and Fig. VIII is a process flow diagram of an embodiment of the invention as applied to the separation and recovery of meta-xylene and para-xylene from a mixture thereof.

Reference is now made to Fig. I to show the formation of solid complexes between carbon tetrabromide and the various xylenes. The temperature-composition curves in Fig. I show that carbon tetrabromide undergoes a transition at about 48° C. and forms equimolar compounds with each of the xylenes. No complex is indicated, however, for ethyl benzene above about −60° C. although there is evidence that a point of incongruency may occur in the vicinity of −65° C. The para-xylene-carbon tetrabromide complex is stable up to its melting point of about 54° C.; the ortho-xylene complex and meta-xylene complex melt incongruently at about 10° C. and −20° C., respectively.

The carbon tetrachloride: $C_8$ aromatic hydrocarbon systems behave somewhat similarly to the corresponding carbon tetrabromide systems. Two of the binary systems are represented in Fig. II: (1) carbon tetrachloride:para-xylene and (2) carbon tetrachloride:ortho-xylene. An equimolar complex with para-xylene, with a melting point of 0° C., is indicated, but apparently no complex with ortho-xylene ocurs. As in the case of carbon tetrabromide, carbon tetrachloride occurs in two crystalline forms, the transition point being about −48° C.

Fig. III shows the formation of 2-component equimolecular stable solid complexes between para-xylene and the two tetrahalomethanes, namely, bromo-trichloromethane and dibromodichloromethane, with melting points of about 12° C. and 25° C., respectively. The third curve in that figure however, indicates that no complex is formed between para-xylene and the trihalomethane, dibromochloromethane.

Fig. IV shows the isoplethic relationships at constant adjunct concentration for the two multi-component systems of mixtures of $C_8$-aromatic hydrocarbons with bromotrichloromethane and with dibromodichloromethane, wherein the $C_8$-aromatic hydrocarbon mixtures comprised a mixture of para-xylene, meta-xylene, ortho-xylene and ethylbenzene with the last three compounds being present in the approximate weight proportions: meta xylene 32.5%, ortho-xylene 18% and ethylbenzene 37.5%. Although these particular isopleths are only illustrative and do not necessarily represent the optimum adjunct concentration, they show that high recoveries of para-xylene from admixtures with other $C_8$-aromatic hydrocarbons can be achieved at low freezing temperatures (−70 to −80° C.) as with carbon tetrachloride. However, carbon tetrachloride has the advantages of greater stability and more economical recovery.

With reference to Fig. V, which shows the temperature-composition, liquid-solid phase diagram of meta-xylene and para-xylene when dissolved in various amounts of carbon tetrabromide, it will be observed that there is an effective and significant displacement of the meta-xylene: para-xylene eutectic which varies with the total carbon tetrabromide concentration. Also, as indicated in the diagram, there are five regions characterized by the solid phase which can coexist with liquid phase. In the region C, the solid is carbon tetrabromide; in the region C—P, the solid is a para-xylene:carbon tetrabromide complex which contains one mole of carbon tetrabromide to one mol of para-xylene ($CBr_4$·para-xylene); in the region P, the solid is para-xylene; in the region M, the solid is meta-xylene; in the region C—M, the solid is a meta-xylene:

carbon tetrabromide complex which contains one mol of carbon tetrabromide to one mol of meta-xylene (CBr$_4$·meta-xylene)

It should be observed that the significant behavior in this system is the curvature of the eutectic line separating the regions C and C—P toward meta-xylene, i. e. decreasing para-xylene content of the eutectic composition with respect to meta-xylene, as the carbon tetrabromide concentration is reduced.

Referring now to Fig. VI there are five regions in the diagram characterized by the solid phase which can coexist with a liquid phase. In the regions C, C—P, C—E, E and P, the solid phases are respectively: carbon tetrabromide; the carbon tetrabromide:para-xylene complex which contains one mol of carbon tetrabromide to one mol of para-xylene; the carbon tetrabromide:ethylbenzene complex which contains one mol of carbon tetrabromide to one mol of ethylbenzene; ethylbenzene and para-xylene. Likewise, referring now to Fig. VII, there are five regions in the diagram characterized by the solid phase which can coexist with a liquid phase. In the regions C, C—M, C—E, E and M, the solid phases are respectively: carbon tetrabromide; the carbon tetrabromide:meta-xylene complex which contains one mol of carbon tetrabromide to one mol of meta-xylene; the carbon tetrabromide:ethylbenzene complex which contains one mol of carbon tetrabromide to one mol of ethylbenzene; ethylbenzene and meta-xylene.

An application of the invention is clearly set forth with reference to Fig. V. In addition to the eutectic lines of the ternary system, three lines representing three steps of a process of the invention have been drawn. The first step, represented by line A, is that of crystallizing and separating out the para-xylene:carbon tetrabromide complex by cooling; the second step, represented by line B, is that of reducing the carbon tetrabromide concentration of the mother liquor; the third step, represented by line C, is that of crystallizing and separating the meta-xylene:carbon tetrabromide complex.

Thus, still referring to Fig. V, when a mixture of such composition as represented by the point Q is cooled not only is there a change in temperature of the system, but also, due to this lowering of the temperature, solidification and separation of a solid phase complex, the para-xylene:carbon tetrabromide complex (CBr$_4$·para-xylene) takes place. As a result of the separation of this solid phase complex the composition of the remaining liquid mixture progressively changes, diminishing in the proportions of carbon tetrabromide and para-xylene contained therein. This change in composition and lowering of temperature takes place until the liquid mixture has the composition represented by point R. Point R is located close to the eutectic line, the chilling operation being controlled and stopped somewhat short thereof, so as to insure high purity of the solid phase para-xylene complex without risking contamination thereof with meta-xylene which would occur if the cooling were continued for such a time as to cause the composition of the liquid mixture to lie on the eutectic line and some of the eutectic compositions were allowed to solidify. The eutectic line represents those compositions of mixtures from which it is not possible to separate out a solid phase containing carbon tetrabromide as a complex with only one of the aromatic components therein by a decrease in temperature. Instead a solid phase composed of all three components separates. For further separation after removal of carbon tetrabromide direct freezing may be used.

Thus, it is seen that the separation of only one of the components of a mixture as a solid phase complex with carbon tetrabromide is possible, provided of course that the composition of the mixture does not correspond to any point on the eutectic lines.

The recovery of a particular aromatic compound from its corresponding solid phase complex with carbon tetrabromide, may be readily effected by distillation as will be readily understood by those skilled in the art. For example, para-xylene may be readily separated from carbon tetrabromide with which it occurs as a solid phase complex by melting and fractional distillation, under reduced pressure if desired.

The separated mother liquor having the composition represented by point R (which point corresponds to compositions containing 2% by wt. para-xylene on a xylene basis) in Fig. V is transferred to an appropriate receiver and carbon tetrabromide removed therefrom. The removal of carbon tetrabromide may be accomplished by various methods, as for example, by distillation. As a result of the removal of carbon tetrabromide the composition of the solution will change to a composition such as is represented by point T. It should be noted that the composition of the liquid mixture resulting from the removal of carbon tetrabromide will lie somewhere along a line drawn through point R and that point of the three phase diagram which represents 100% carbon tetrabromide. Since carbon tetrabromide is being removed the resulting composition of the liquid mixture will be represented by a point on this line in the direction of diminishing carbon tetrabromide content. Furthermore, since point T now lies in the meta-xylene:carbon tetrabromide complex region, upon cooling the mixture of this composition as represented by point T a solidification and separation of meta-xylene complex takes place.

As a result of the separation of this second solid phase complex the composition of the resulting liquid mixture progressively changes, diminishing in the amount of carbon tetrabromide and meta-xylene. The cooling is continued and a change in composition takes place until a composition represented by point U is reached. Point U is located near the eutectic line, the cooling operation being controlled and stopped so as to yield a liquid mixture composition of that composition and so as to insure high purity of the solid phase meta-xylene complex without risking contamination thereof with para-xylene.

It should be noted that the mother liquor of composition U or R remaining after the separation of the meta-xylene complex and the para-xylene complexes respectively may be returned to the process at any suitable point depending upon the operating conditions or it may be recovered as product after the carbon tetrabromide is removed, since it contains substantially pure meta-xylene. Likewise, the recycle of the carbon tetrabromide, recovered from the separation of the organic compounds from the solid phase complexes and/or from the operation wherein carbon tetrabromide is removed from the liquid mixture (i. e. the step of going from point R to T) may be accomplished at any suitable point depending upon the operating conditions. The manner and method of recycling the above materials to the best advantage will readily be apparent to one skilled in the art. It is further pointed out that point W on line WZ which separates the meta- and para-xylene regions corresponds to about 15% para-xylene on the xylene basis.

A more detailed description of an application of the invention is now made with reference to Fig. VIII. Fig. VIII is a process flow diagram showing an application of the invention to the separation of meta-xylene and para-xylene from mixtures containing the same. For the sake of simplicity and in order that the process may be more readily understood, various storage tanks, pumps, instruments, service accessories, additional heat exchangers etc., have been omitted from the schematic drawing: the proper placement and use of these devices will be obvious to one skilled in the art. It will be understood that the incorporation of the various numerical values into the description of the operation is made solely for the purpose of illustration and clarification and that various modifications may be readily made. The feed stock of xylenes utilized in the process indicated by Fig. VIII may widely vary as to the proportions of the various complex forming organic compounds therein (for example, the proportions of meta- to para-xylene). However, for the purpose of illustration, a feed stock of the following approximate composition in mol (or weight) percent: para-xylene 20–25% and meta-xylene 75–80% may be used. To a mixture of xylenes of this composition is added an amount of carbon tetrabromide sufficient to produce an admixture having the composition corresponding to that of point Q within the C—P region as shown in Fig. V. This mixture containing the above components in the aforementioned amounts is then introduced by means of line 10 into dryer 11. The dried mixture is then chilled in cooler 12 to a suitable temperature with the formation of a precipitate, consisting of the solid phase complex of carbon tetrabromide and para-xylene (C—P) said complex containing one mol of carbon tetrabromide per mol of para-xylene. The resultant slurry from cooler 12 is transferred by means of line 13 to centrifuge 14 wherein the solid phase is separated from the mother liquor. The solid may be washed in the centrifuge with a small amount of para-xylene to remove adherent meta-xylene, the washings being added to the mother liquor or collected separately and recycled for admixing with the feed. The separated solid complex is then removed from the centrifuge, melted and transferred to the stripper 17 by transfer means 15; stripper 17 is heated by indirect heating means 16 or by direct heat with steam employing any suitable heating medium, such as superheated steam. The components of the complex are separated in stripper 17, pure para-xylene, free of meta-xylene, being recovered as distillate from the top of the stripper 17 and being collected as para-xylene product. The bottoms in the stripper 17 is principally carbon tetrabromide and is removed as desired through line 19.

The mother liquor resulting from the separation of the para-xylene solid phase complex is transferred from centrifuge 14 by line 35 to a stripper 21 which is heated by indirect heating means 20 employing any suitable heating medium. Therein, the mother liquor is separated into its constituents, namely a distillate mixture of meta-xylene contaminated with some para-xylene and a bottoms fraction of carbon tetrabromide. The meta-xylene may be withdrawn as product since it is of fairly high purity or it may be further purified by collection from stripper by means 24, and the addition thereto of a portion of the carbon tetrabromide, coming from stripper 21 by means 22. This resulting mixture of para- and meta-xylenes and carbon tetrabromide is chilled in cooler 23 to a suitable temperature to yield a precipitate consisting of the solid phase complex of carbon tetrabromide and meta-xylene. The resultant slurry from cooler 23 is transferred by line 26 and subjected to centrifugation in centrifuge 27. The separated solid complex is then withdrawn from the centrifuge, melted and transferred to stripper 30 by transfer means 28; stripper 30 is heated by indirect heating means 29, employing any suitable heating medium. The components of the complex are separated at a suitable temperature and pressure, reduced pressure being used if so desired so that lower temperatures may be used, pure meta-xylene substantially free of para-xylene being recovered as distillate and collected as meta-xylene product. The bottoms fraction comprises essentially carbon tetrabromide and may be removed as desired by line 32.

The mother liquor resulting from the separation of the meta-xylene solid phase complex may be removed from centrifuge 27 and transferred by line 34 as recycle material to be used with fresh feed containing a mixture of para- and meta-xylenes. Likewise, the carbon tetrabromide recovered in the various strippers 17, 21 and 30 may be transferred by lines 19, 25 and 32 respectively, to line 33 and transferred as recycle material to be used with fresh feed containing a mixture of para- and meta-xylenes.

Carbon tetrachloride may be utilized in a similar process for the separation of mixtures of xylenes. In that case, however, carbon tetrachloride will be recovered as distillate in the strippers and the xylenes as bottoms fractions.

It has been determined, for example, that para-xylene may be recovered in a yield of about 80% or more, based on para-xylene content of feed stock, at a purity of the order of 95% or better, from a feed stock consisting essentially of $C_8$-aromatic hydrocarbons in the following proportions: ortho-xylene—17.9, meta-xylene—32.6, para-xylene—12.0, ethylbenzene—37.5. This may be accomplished by admixing 100 mol proportions of the $C_8$-aromatic hydrocarbons with about 33.6 mol proportions of carbon tetrachloride, chilling the mixture to about $-80°$ C. to produce a solid adduct of para-xylene and $CCl_4$ in a 1:1 mol ratio, separating the solid adduct from the mother liquor by centrifugation, melting the separated solid adduct and distilling the $CCl_4$ from the para-xylene. Accordingly, at a feed rate of about 3650 pounds per hour of said $C_8$-aromatic hydrocarbon feed stock a para-xylene product is recoverable at the rate of about 395 pounds per hour containing about 375 pounds of para-xylene, the remainder being other $C_8$-aromatics.

From the foregoing explanations and descriptions it is seen that it is possible to separate para-xylene and/or meta-xylene from mixtures containing the same by selective crystallization of a solid phase complex with carbon tetrabromide or with carbon tetrachloride. Likewise, with reference to Figures VI and VII, respectively, it is also possible by applying the same methods to separate para-xylene and/or ethylbenzene from mixtures containing the same by selective crystallization of a solid phase complex with carbon tetrabromide, and to separate meta-xylene and ethylbenzene from mixtures containing the same by selective crystallization of a solid phase complex with carbon tetrabromide. Furthermore, from a study of Figs. V, VI and VII a good approximation of the quaternary phase diagram of carbon tetrabromide ethylbenzene, para- and meta-xylene may be had and which will show that it is also possible to separate meta- and para-xylene and ethylbenzene from mixtures containing these three components by selective crystallization with carbon tetrabromide.

The application of the invention is not restricted to the separation of the components of mixtures of the various disubstituted aromatic hydrocarbons or to the separation of $C_8$ aromatic hydrocarbons but is also applicable to the separation of tri- and tetra-substituted aromatic organic compounds especially the $C_9$ and $C_{10}$ aromatic hydrocarbons. In general, the processes outlined above are applicable to the separation of isomeric aromatic hydrocarbons from mixtures containing the same. The invention is also applicable, to the separation of isomeric aromatic organic compounds particularly the hydroxy substituted aromatic compounds, such as the cresols and xylenols, also the halo- and nitro-aromatic compounds and the aromatic amines, such as the toluidines, also the various alkyl substituted pyridines, such as the beta- and gamma-picolines and the lutidines, also the various isomeric derivatives of pyrrols, thiophene, quinoline and furan, especially the alkyl derivatives.

It should be noted that in the processes described herein there may be admixed with the components to be separated minor amounts, up to about 40% by weight of ortho-xylene along with any other of the various organic hydrocarbon compounds, normally associated with the compounds to be separated, particularly the xylenes. Of course, in general ortho-xylene is largely separable from the other $C_8$-aromatics by distillation. In addition, also there may be added to the components to be separated minor amounts of corrosion inhibitors and stabilizers for the tetrahalomethanes.

It has also been found that liquid paraffin hydrocarbons even in major amounts may be added to the aromatic hydrocarbon mixture to be separated by complex formation with a halomethane. In effect the paraffin hydrocarbons act as diluent and have little effect upon the relative concentration of the various aromatic hydrocarbons at which the eutectics occur, particularly so upon mixtures of the various xylenes and their isomers. In general the paraffin hydrocarbons affect only the temperature of the eutectic in the system and that not greatly because the lowering of the solubility and concomitant raising of the solidification temperature of the complexes caused by the paraffins tends to compensate for the dilution brought about by its presence. In some cases the net effect may be an advantageous elevation of the solidification temperature.

In addition to the utility of the solid adducts, as described in detail with respect to the indicated separations, the solid adducts or complexes of this invention are useful for other purposes, particularly for combatting objectionable lower forms of animal and plant life, such as insects, soil nematodes and fungi, etc. For example, the $CBr_4 \cdot$p-xylene adduct may be incorporated in insecticidal dusts, contributing both halogenated hydrocarbon and aromatic hydrocarbon as active toxic agents. The adducts may also be utilized in solid cleaning agents.

We claim as our invention:

1. The method of separating components from a mixture consisting essentially of $C_8$ aromatic hydrocarbons containing para-xylene and meta-xylene, which method comprises (1) forming a first admixture of said mixture with an amount of carbon tetrabromide such that the composition of the admixture falls within that region of a temperature-composition, liquid-solid phase diagram of the resulting system in which a solid complex (A) consisting only of equimolar proportions of carbon tetrabromide and a first one of said xylenes is first produced on cooling; (2) cooling said first admixture to produce only said solid complex (A); (3) separating said solid complex (A) from a resulting first mother liquor; (4) altering the proportion of carbon tetrabromide in said first mother liquor to form a second admixture the composition of which falls within that region of a temperature-composition, liquid-solid phase diagram of the resulting system in which a second solid complex (B) consisting only of equimolar proportions of carbon tetrabromide and the other one of said xylenes is first produced on cooling; (5) cooling said second admixture to produce only said second solid complex (B); and (6) separating said second solid complex (B).

2. The method of separating components from a mixture consisting essentially of $C_8$ aromatic hydrocarbons containing para-xylene and meta-xylene in proportions such that the concentration of para-xylene is greater than 2 percent by weight of the total of said para-xylene and meta-xylene, which method comprises (1) forming a first admixture of said mixture with an amount of carbon tetrabromide such that the composition of the admixture falls within that region of a temperature-composition, liquid-solid phase diagram of the resulting system in which a solid complex (A) consisting only of equimolar proportions of carbon tetrabromide and para-xylene is first produced on cooling; (2) cooling said first admixture to produce only said solid complex (A); (3) separating said solid complex (A) from a resulting first mother liquor; (4) altering the proportion of carbon tetrabromide in said first mother liquor to form a second admixture the composition of which falls within that region of a temperature-composition, liquid-solid phase diagram of the resulting system in which a second solid complex (B) consisting only of equimolar proportions of carbon tetrabromide and meta-xylene is first produced on cooling; (5) cooling said second admixture to produce only said second solid complex (B); and (6) separating said second solid complex (B).

References Cited in the file of this patent

UNITED STATES PATENTS

| | | |
|---|---|---|
| 2,435,792 | McArdle et al. | Feb. 10, 1948 |
| 2,459,146 | Bowman | Jan. 18, 1949 |
| 2,459,191 | Slagle et al. | Jan. 18, 1949 |
| 2,470,116 | Swietoslawski et al. | May 17, 1949 |

OTHER REFERENCES

Chem. Abstracts, vol. 42, 1902e (1948).